Dec. 16, 1941.  C. M. OSTERHELD  2,266,248

OFF-PEAK WATER HEATING SYSTEM

Filed Nov. 12, 1940  3 Sheets-Sheet 1

INVENTOR
CLARK M. OSTERHELD
BY
ATTORNEY

Dec. 16, 1941.  C. M. OSTERHELD  2,266,248
OFF-PEAK WATER HEATING SYSTEM
Filed Nov. 12, 1940   3 Sheets-Sheet 3

INVENTOR
CLARK M. OSTERHELD
BY H. M. Biefel
ATTORNEY

Patented Dec. 16, 1941

2,266,248

UNITED STATES PATENT OFFICE 2,266,248

OFF-PEAK WATER HEATING SYSTEM

Clark M. Osterheld, Stoughton, Wis., assignor to McGraw Electric Company, Elgin, Ill., a corporation of Delaware Application November 12, 1940, Serial No. 365,257

7 Claims. (Cl. 219—39)

My invention relates to electric water heating systems and particularly to off-peak water heating systems particularly applicable to domestic hot water tanks.

An object of my invention is to provide relatively simple means to ensure prolongation of the energization of an electric heater on a hot water tank beyond the end of an off-peak period in case less than a predetermined amount of water in the tank is hot at that time.

Another object of my invention is to provide an off-peak water heating system embodying a thermally-controlled energization-delay means and a time and thermally controlled energization-prolongation means in a hot water heating system.

Another object of my invention is to provide relatively simple time-controlled and thermally-controlled switching means effective to cause energization of the single heater of a hot water tank at either the start of an off-peak period or after a predetermined delay period after the start of an off-peak period in accordance with the amount of hot water in the tank at the start of an off-peak period as well as to ensure prolongation of the energization of the heater beyond the end of an off-peak period in case of certain conditions existing in the tank at the end of an off-peak period as to the amount of water which has been heated to a predetermined high temperature.

Other objects of my invention will either be apparent from a description of several forms of systems embodying my invention or will be pointed out hereinafter and particularly set forth in the appended claims.

Figures 1, 2:
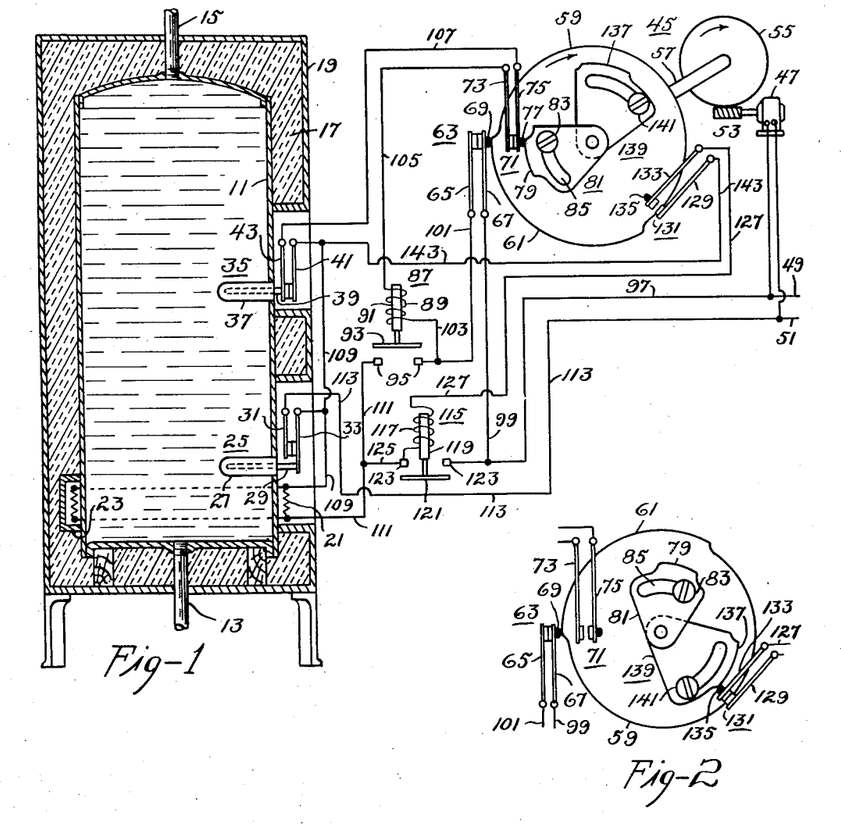
Figure 1 is a schematic representation of a water heating system embodying my invention as applied to an ordinary domestic hot water tank.
Fig. 2 is a view of part of the timer used in my system with the parts thereof shown in another operative position differing from that shown in Fig. 1 of the drawings.

Referring first of all to Fig. 1 of the drawings, I have there illustrated an off-peak water heating system which is effective to cause energization of the single heater associated with a hot water tank if less than a predetermined fractional part of the water content of the tank is hot at the start of an off-peak period, which will delay energization of the heater for an adjustably preset fixed length of delay time in case more than said predetermined fractional part of the water content is hot, which will deenergize the heater if all of the water is hot and which will prolong the energization of the heater beyond the end of an off-peak period in case less than substantially all of the water in the tank is hot at the end of an off-peak period.

My improved system is illustrated as being associated with an ordinary hot water tank 11 now used in homes and which is shown as of the usual elongated cylindrical type having a cold water inlet pipe 13 connected therewith at its lower end and a hot water outlet pipe 15 connected therewith at its upper end. The tank may be surrounded by a mass or layer 17 of heat-insulating material which may be enclosed in an outer casing 19, all in a manner now well known in the art. While I have shown a particular type of heat-insulated hot water tank, my invention is not to be considered as being limited thereto.

I provide a single electric heating element 21 which may be of any suitable or desired kind and which may be located in a tunnel member 23 and reference may here be made to my Patent No. 2,226,526, issued December 24, 1940, in which a heater which I may use is disclosed and claimed.

I provide a lower thermal heater control switch 25 which is shown as including a tubular member 27 secured in a fluid-tight manner to the wall of the tank 11 to be positioned therewithin and to have located therein an expansion rod 29. The main switch 25 includes also a relatively rigid contact arm 31 and a resilient contact arm 33 normally yieldingly biased into engagement with contact arm 31 but adapted to be moved out of engagement therewith when tubular member 27 is surrounded by hot water with resultant expansion of rod 29 to thereby cause disengagement of the two contact arms. I desire it to be understood that while I have shown particular details of the thermal switch and its position as regards the heater 21, I do not desire to be limited thereto the only requirement to be met by the structure and mounting of the main thermal switch 25 being that it will cause opening of the heater circuit controlled thereby when substantially all of the water in the tank is hot.

I provide an auxiliary thermal control switch 35 here shown as including a tubular member 37 similar to tubular member 27, an expansion rod 39, a relatively rigid contact arm 41 and a resilient contact arm 43 normally yieldingly biased out of engagement with contact arm 41 but adapted to be moved into engagement therewith when expansion rod 39 has expanded in length by reason of it and the tubular member 37 being subjected to hot water in the upper part of the tank.

While I have illustrated specific details of the main and of the auxiliary thermal switches, I do not desire to be limited thereto and I wish to call attention also to the fact that while I have shown the auxiliary thermal switch as being positioned at substantially the mid-height of the tank, I do not desire to be limited to this particular position. I may mount it higher up in or on the tank or farther down in or on the tank and the amount of water referred to when a predetermined fractional part of the water content of the tank is mentioned is that corresponding to the position of the auxiliary thermal switch 35.

I provide a continuously operative timing means 45 here shown as including an electric motor 47 electrically connected to continuously energized supply circuit conductors 49 and 51. A worm gear 53 is mounted on the shaft of motor 47 and is adapted to mesh with or drive a cam disc 55 which is mounted on a shaft 57. The design, construction and adjustment of the parts 47, 53, 55 and 57 of the continuously operative timer are such that the shaft 57 is caused to rotate through one complete turn in twenty-four hours so that a cam disc 59 adjustably mounted thereon will be caused to turn through one complete revolution in a twenty-four hour day. While I have not shown any bearings for the shaft 57, these are to be understood as being a part of the thermal timing means which is electrically connected to the continuously energized supply circuit, in a manner now well known in the art.

The greater part of the periphery of the cam disc 59 is of uniform diameter while a portion 61 of the periphery is of somewhat larger outer radius for a purpose which will appear. The peripheral extent of the portion 61 of greater outer radius is that which is considered by the engineers of the central power station supplying current to this system as their off-peak period and I have shown this peripheral extent as being such as to cover approximately an eight-hour period. For illustrative purposes we may consider that the off-peak period begins at 10:00 p. m. and ends at 6:00 a. m. I wish to point out, however, that I do not desire to be limited to this particular length of off-peak period nor to the starting and the ending time hereinbefore mentioned since other cam discs may be substituted, having different lengths of off-peak period portions 61 and the cam disc 59 may be adjustably mounted on shaft 57 so that not only the time of starting of an off-peak period but also its duration may be adjusted in accordance with the desires or demands of the electric distribution system supplying current to my improved water heating system.

I provide a main timer-controlled heater-control switch 63 including a relatively rigid contact arm 65, a resilient contact arm 67 normally yieldingly biased out of engagement with contact arm 65 but adapted to be moved into engagement therewith when a lug 69, of electric-insulating material, mounted on the arm 67 is engaged by the portion 61 of cam disc 59. It is evident that main timer-controlled switch 63 will be open during all of the on-peak period of a twenty-four hour day, will be moved into closed position at the start of an off-peak period and will be held in such closed position during all of an off-peak period.

I provide also an auxiliary timer-controlled switch 71 including a relatively rigid contact arm 73 and a resilient contact arm 75 normally yieldingly biased out of engagement with contact arm 73 but adapted to be moved into engagement therewith when a lug 77, of electric-insulating material, secured to arm 75 is engaged by a cam surface 79 forming part of an adjustable cam member 81 which may be supported by shaft 57 and may be located adjacent to the front surface of cam disc 59, a clamping screw 83 fitting into an arcuate slot 85 therein to permit of adjustably setting the member 81 relatively to the cam disc portion 61.

I provide an electromagnetic retardation-switching means 87 here shown as including a coil 89, a magnetizable core 91 having connected therewith a contact bridging member 93. A pair of fixed contact members 95 may be engaged with bridging member 93 under certain operating conditions of the system which will hereinafter appear.

Supply circuit conductor 49 is connected by a conductor 97 and a conductor 99 with contact arm 67 while contact arm 65 is connected by a conductor 101 with one of the fixed contact members 95 and by a conductor 103 with one terminal of coil 89. The other terminal of coil 89 is connected by a conductor 105 with contact arm 73, while contact arm 75 is connected by a conductor 107 with contact arm 43 of thermal switch 35. A conductor 109 connects contact arm 41 with contact arm 33 and also with one terminal of the heater 21. The other terminal of heater 21 is connected by a conductor 111 with the other fixed contact member 95.

The operation of the system as to the parts thus far described is as follows: Let it be assumed that less than a predetermined fractional part of the water content of the tank is hot at the start of an off-peak period, when the parts of the timing means will be in the positions shown in Fig. 1 of the drawings, so that the upper auxiliary thermal switch 35 is subject to cold water in the tank. Under these conditions contact arm 43 will be out of engagement with contact arm 41 and when the main timer-controlled switch 63 is moved into the position shown in Fig. 1 of the drawings, an energizing circuit through the heater 21 will be established as follows: From supply circuit conductor 49 through conductors 97 and 99, through engaged contact arms 67 and 65, through conductor 101, through the engaged contact members 95 and 93 (which will be in engagement with each other because coil 89 is not energized) through conductor 111, through heater 21, through conductor 109, through engaged contact arms 33 and 31 and from there through a conductor 113 to the other supply circuit conductor 51. This will, therefore, cause energization of the heater 21 which energization will be interrupted by the action of the main thermal heater control switch 25 should substantially all of the water in the tank be heated before the end of an off-peak period.

Let it be assumed, however, that at the start of an off-peak period such an amount of hot water in the tank was present as would subject the upper thermal switch 35 to hot water, then contact arms 41 and 43 would be in engagement with each other and an energizing circuit for the coil 89 would be established upon closing of the main timer-controlled switch and the auxiliary timer-controlled switch 71 at the start of an off-peak period. It is to be noted that the position of cam member 81 is such as will cause auxiliary switch 71 to be closed at the start of an off-peak period. The energizing circuit through coil 89 is as follows: From supply circuit conductor 49 through conductors 97 and 99, through engaged contact arms 67 and 65, through conductors 101 and 103, through coil 89, through conductor 105, through engaged contact arms 73 and 75, through conductor 107, through engaged contact arms 43 and 41, through conductor 109, through engaged contact arms 33 and 31 and from there through conductor 113 to the other supply circuit conductor 51. This will cause energization of the coil 89 and of the core 91 with resultant upward movement of the core member and of the contact bridging member 93 into the positions shown in Fig. 1 of the drawings so that the hereinbefore described heater-energizing circuit will not be established at the start of an off-peak period.

If no withdrawal of hot water occurs during the adjustably preset delay period, which may be on the order of two or three hours, this energizing circuit of coil 89 will continue, to be interrupted only at the end of the delay period by reason of the turning movement of cam surface 79 out of engagement with lug 77 and consequent disengagement of contact arm 75 from contact arm 73. When this occurs contact bridging member 93 will move into engagement with fixed contacts 95 and energization of the heater 21 will occur, to be interrupted by the main thermal switch 25 if all or substantially all of the water in the tank becomes hot before the end of an off-peak period.

Let it be assumed, however, that withdrawal of hot water from the tank occurred during the delay period with attendant disengagement of contact arm 43 from contact arm 41 because the auxiliary switch 35 is then subjected to cold water, the energizing circuit through coil 89 is interrupted by disengagement of contact arm 43 from contact arm 41 and the hereinbefore described heater-energizing circuit will be closed.

Let it now be assumed that it is desired to prolong the energization of the heater 21 beyond the end of an off-peak period in case all of the water in the tank is not hot at the end of an off-peak period and the engineers of the utility supplying current to the user of my water heating system wish to assure that the daylight part of a twenty-four hour day is started with all or substantially all of the water in the tank hot. In order to do this I provide the following additional parts. An energization-prolongation electromagnetic switch 115 which includes a coil 117, a magnetizable core 119, and a contact bridging member 121, which latter is adapted to engage with and be disengaged from fixed contact members 123. It is to be noted that when coil 117 is not energized by a current passing therethrough, contact bridging member 121 will be in its lowered position out of engagement with fixed contact members 123 whereas the opposite statements applied to the energization-delay switch 87. One of the fixed contact members 123 is connected to conductors 97 and 99, while the other fixed contact 123 is connected by conductor 125 to conductor 111. That fixed contact 123 having conductor 125 connected thereto has also connected thereto one terminal of coil 117 while the other terminal of coil 117 is connected by a conductor 127 to a resilient contact bar 133 of a second auxiliary timer-controlled switch 131. This switch includes a resilient contact arm 133 normally yieldingly biased out of engagement with a relatively rigid contact arm 129 but adapted to be moved into engagement therewith when a lug 135, of electric-insulating material, on arm 133 is engaged by a cam surface 137 on a second cam member 139 which is of substantially the same general shape as cam member 81. Cam member 139 is adapted to be adjustably positioned relatively to cam disc 59 by a clamp screw 141 holding member 139 in adjusted position adjacent to the front face of cam disc 59. I desire, however, to point out that while I have shown particular constructions and locations for the cam members 81 and 139, my invention is not limited to these particular details, which have been shown generally only in their simplest form.

Fig. 2 of the drawings shows the positions of the parts of the cam members 81 and 139 and of the cam disc 59 just before the end of an off-peak period. It will be noted that heater control switch 63 is still in its closed position since lug 69 is still engaged by cam surface 61 and cam surface 137 has been moved into engagement with lug 135 on contact arm 133 to cause it to move into engagement with contact arm 129 of the second auxiliary switch 131, controlled by the timer.

The closure of the second time-controlled switch 131 effected energization of coil 117 through a circuit substantially as follows: From supply circuit conductor 49 through conductors 97 and 99, through engaged contact arms 67 and 65, through conductor 101, through engaged contact arms 93 and 95, through conductors 111 and 125, through coil 117, through conductor 127, through engaged contact arms 133 and 129, through a conductor 143 to conductor 109, through engaged contact arms 33 and 31 and from there through conductor 113 to the other supply circuit conductor 51.

The energized coil 117 therefore causes upward movement of core member 119 and contact bridging member 121, the latter engaging fixed contact members 123 to close another energizing circuit through heater 21 substantially as follows: From supply circuit conductor 49 through conductor 97, through engaged contacts 123 and 121, through conductors 125 and 111, the heater 21, through conductor 109, through engaged contact arms 33 and 31 and from there through conductor 113 to the other supply circuit conductor 51. This will, therefore, effect energization of the heater through another heater-energizing circuit including the electromagnetic prolongation switching means 115 and the main thermal switch 25.

As it is desired that energization of the heater 21 be prolonged beyond the end of the off-peak period, it is necessary to have a holding circuit for the coil 117 which is independent of the main heater control switch 63 and this holding circuit for coil 117 is as follows: From supply circuit conductor 49 through conductor 97, through engaged contact members 123 and 121, through coil 117, through conductor 127, through engaged contact arms 133 and 129, through conductors 143 and 109, through engaged contact arms 33 and 31 and from there through conductor 113 to the other supply circuit conductor 51. It is, therefore, obvious that deenergization of the heater 21 can be effected in two ways, by two different switches depending upon whether all of the water in the tank is hot before the end of the prolongation period or whether less than all of the water in the tank is hot before the end of the prolongation period, which latter is determined by the peripheral extent of the cam surface 137 as well as by its position relatively to the end of the cam surface 61.

If all of the water in the tank is hot before cam surface 137 has been turned out of engagement with lug 135 on contact arm 133, the thermal heater control switch 25 is effective to interrupt the circuit and once this circuit has been interrupted, it will not be reclosed in case withdrawals of hot water occur from the tank before the end of the prolongation period. If, on the other hand, substantially no hot water is withdrawn from the tank but all of the water in the tank is not hot before the end of the prolongation period, energization of the heater 21 will be terminated by reason of the disengagement of contact arm 133 from contact arm 129 with attendant deenergization of coil 117 and disengagement of contact bridging member 121 from fixed contact members 123. In this case also withdrawal of hot water occurring before the end of the prolongation period, sufficient to subject main thermal switch 25 to cold water, reenergization of the heater will not be effected since the conditions necessary for reenergizing the system, and particularly the heater 21, are not present as is apparent from a consideration of the energizing circuits and the control circuits therefor as above set forth.

Figure 3:
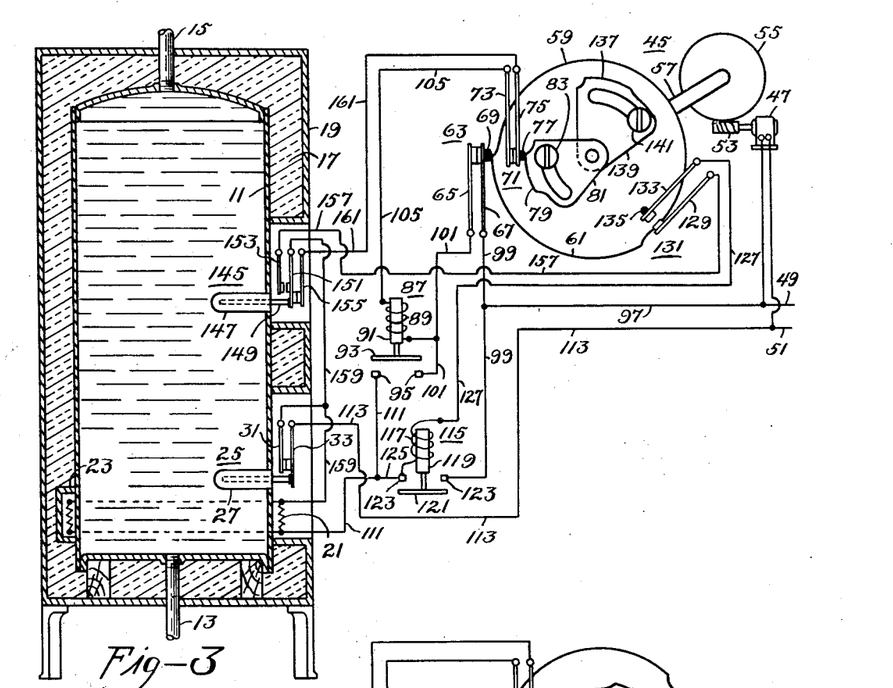
Fig. 3 is a view similar to Fig. 1 but showing different thermal control elements.

Referring now to Fig. 3 of the drawings, I have there illustrated a slightly modified form of system which is effective to energize the heater 21 at the start of an off-peak period in case less than a predetermined fractional part of the water content of the tank is hot at the start of an off-peak period, which will delay energization of the heater for an adjustably preset length of time after the start of an off-peak period in case more than said predetermined fractional part of the water is hot, which will deenergize the heater as soon as all or substantially all of the water in the tank is hot and which will cause prolongation of the energization of the heater after the end of an off-peak period if less than said predetermined fractional part of the water content in the tank is hot at the end of an off-peak period.

In this modification I provide the same or substantially the same continuously operative timer parts, a main heater control switch and a first and a second auxiliary timer-controlled switch as hereinbefore described. I provide also an energization-delay-electromagnetic switch and an energization-prolongation-electromagnetic switch as was hereinbefore described for the system shown in Fig. 1 of the drawings. I provide also a main thermal heater control switch but I provide a slightly modified form of auxiliary thermal control switch 145. This switch includes a tubular member 147 similar to tubular members 27 and 37, an expansion rod 149 in the tubular member adapted to engage a resilient contact arm 151 which is normally yieldingly biased into engagement with a relatively rigid contact arm 153 when the tubular member 147 is subjected to cold water but which is adapted to be moved into engagement with another outer relatively rigid contact member 155 by rod 149 when it and the tubular member 147 are subjected to hot water.

Contact arm 153 of the auxiliary thermal switch 145 is connected by a conductor 157 to contact arm 129 of the second auxiliary time control switch 131. Contact arm 151 of the auxiliary thermal switch 145 is connected by a conductor 159 to contact arm 31 and to one terminal of heater 21. Contact arm 155 is connected by a conductor 161 to contact arm 75 of the first auxiliary timer-controlled switch 71.

Let it be assumed that at the start of an off-peak period when the main heater control switch 63 has just been moved into closed position by the cam surface 61, as shown in Fig. 3 of the drawings, that the tubular member 147 is subjected to hot water with resultant engagement of contact arms 151 and 155, as shown in Fig. 3 of the drawings. In this case an energizing circuit through coil 89 of the delay switch 87 is closed substantially as follows: From supply circuit conductor 49 through conductors 97 and 99, through engaged contact arms 67 and 65, through conductor 101 to coil 89, through conductor 105 to the engaged contact arms 73 and 75, through conductor 161 to and through engaged contact arms 155 and 151, through conductor 159, through engaged contact arms 31 and 33 and from there through the conductor 113 to the other supply circuit conductor 51. This will result in magnetizing core member 91 with attendant upward movement thereof into the position shown in Fig. 3 of the drawings so that contact bridging member 93 controlled thereby is out of engagement with fixed contacts 95, so that no energization of the heater 21 will occur.

Let it be assumed, on the other hand, that tubular member 147 and expansion rod 149 are subject to cold water in the tank, that is, that less than a predetermined fractional part of the water content of the tank is hot. In this case the above described energizing circuit through coil 89 is not established since contact arms 151 and 155 are out of engagement with each other, the attendant result being that contact bridging member 93 is in its lower position where it engages contacts 95, so that an energizing circuit through the heater 21 is established as follows: From supply circuit conductor 49 through conductors 97 and 99, through engaged contact arms 67 and 65, through conductor 101 to and through engaged contacts 95 and 93, through conductor 111, heater 21, a part of conductor 159, through engaged contact arms 31 and 33 and from there through conductor 113 to the other supply circuit conductor 51.

It may be here pointed out that this energization of the coil 21 will continue for as long as the circuit through heater 21 is not interrupted by reason of all of the water in the tank being hot, which interruption will be effected by disengagement of contact arms 31 and 33 of the main thermal heater control switch 25, if all or substantially all of the water in the tank is heated before the end of an off-peak period.

If it be assumed, for illustrative purposes, that more than said predetermined fractional part of the water content of the tank was hot, at the start of an off-peak period, with attendant closure of the energizing circuit through coil 89 by reason of engagement of contact arms 151 and 155 with each other and of the engagement of contact arms 73 and 75 with each other, and assuming further that no withdrawals of hot water occur during the delay period (which would have resulted in disengagement of contact arms 151 and 155 with deenergization of the coil 89 and engagement of contact bridging member with contacts 95) it is obvious that contact arm 75 will move out of engagement with contact arm 73 at the end of the adjustably preset delay period, which may be assumed to be on the order of two or three hours. At the end of this delay period with attendant disengagement of contact arms 75 from contact arm 73, coil 89 will be deenergized, assuming that it was energized, as above stated, and the heater 21 will be energized.

Let it now be assumed that less than a predetermined fractional part of the water in the tank is hot at the end of an off-peak period, then the energization-prolongation switch 115 and the auxiliary thermal switch 145 and the second auxiliary time-control switch 131 will effect prolongation of the energization of the heater 21. The energization of coil 117 will be effected through a circuit substantially as follows: From supply circuit conductor 49 through conductors 97 and 99, through the engaged contact arms 67 and 65, through conductor 101 to and through the engaged contact members 95 and 93, through conductors 111 and 125 to and through coil 117, through conductor 127 to and through engaged contact arms 133 and 129, through conductor 157 to and through engaged contact arms 153 and 151, through conductor 159 to and through engaged contact arms 31 and 33 and from there through conductor 113 to the other supply circuit conductor 51. Engagement of contact arms 151 and 153 of the auxiliary thermal switch 145 is, of course, evident since tubular member 147 is subjected to the temperature of relatively cold water, as hereinbefore noted. This energizing circuit of coil 117 causes upward movement of contact bridging member 121 into engagement with contacts 123 whereby an energizing circuit through heater 21 is closed as follows: From supply circuit conductor 49 through conductors 97 and 99 to and through engaged contacts 123 and 121, through conductors 125 and 111 to and through the heater 21, through conductor 159 to and through engaged contact members 31 and 33 and from there through conductor 113 to the other supply circuit conductor 51.

The above-described coil-energizing circuit of the energization-prolongation switch included the main timer-controlled switch 63 which, of course, will be moved into open position at the end of an off-peak period. A holding circuit for coil 117 independent of the switch 63 is provided by my system, substantially as follows: From conductor 49 through conductors 97 and 99 to and through engaged contact members 123 and 121 through coil 117, through conductor 127 to and through the engaged contact arms 133 and 129, through conductor 157 to and through engaged contact arms 153 and 151, through conductor 159 to and through the engaged contact arms 31 and 33 and from there through conductor 113 to the other supply circuit conductor 51. This holding circuit for coil 117 is independent of the main timer-actuated heater control switch 63 and is dependent upon the second auxiliary time control switch 131, the auxiliary thermal switch 145 and the main thermal heater control switch 25. It is, therefore, obvious that should more than said predetermined fractional part of the water content of the tank become hot during the prolongation period, and before the end of said period, contact arm 151 being moved out of engagement with contact arm 153 will effect deenergization of coil 117 and therefore interruption of the energizing circuit of heater 21 at the prolongation switch contacts 121 and 123.

In case less than a said predetermined fractional part of the water content of the tank becomes hot before the end of the off-peak period, disengagement of contact arm 133 from contact arm 129, occurring at the end of the prolongation period, will also deenergize the above described holding circuit and therefore will also deenergize the heater 21.

Figure 4:
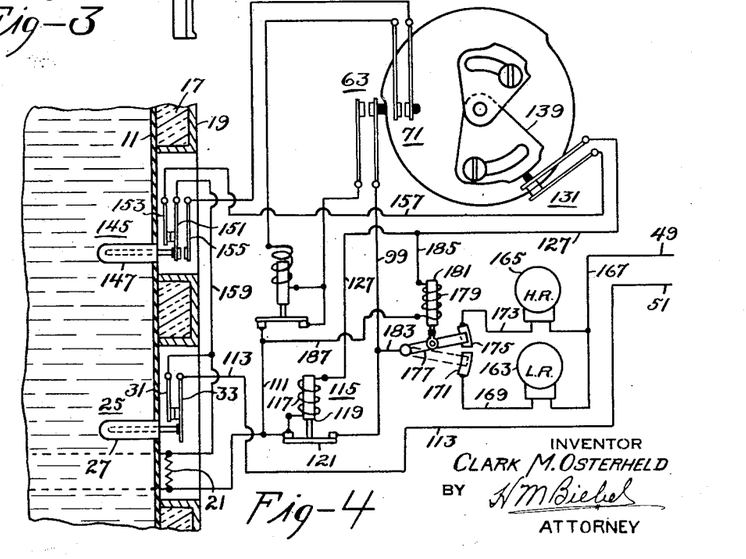
Fig. 4 is a view showing the system of Fig. 3 having added thereto a low-rate wattmeter and a high-rate wattmeter.

Referring now to Fig. 4 of the drawings, I have there illustrated the same circuit as shown in Fig. 3 of the drawings but have added thereto a low-rate watt-hour meter 163 and a high-rate watt-hour meter 165 properly connected and controlled so that all current flowing through the heater 21 during an off-peak period will be registered in the low-rate meter 163 while all of the current traversing the heater 21 during on-peak hours will be registered and recorded in the high-rate meter 165. To obtain this result I connect one terminal of the two meters 163 and 165 in parallel to a conductor 167 which is connected to the first supply circuit conductor 49. The other terminal of meter 163 is connected by a conductor 169 to a fixed contact member 171 while the other terminal of meter 165 is connected by a conductor 173 to a fixed contact member 175. A pivotally mounted contact arm 177 is adapted to be selectively moved into engagement with contacts 171 and 175 by the action of a relay coil 179 having a core member 181 movable therein which core member is pivotally connected to arm 177. The fixed support of arm 177 is connected by a conductor 183 to conductor 99. One terminal of coil 179 is connected by a conductor 185 to conductor 127 while the other terminal of coil 179 is connected by a conductor 187 to conductor 111.

The parts of the system of Fig. 4 are shown in the position which they will occupy during the prolongation period when the main heater control switch 63 is open, the first auxiliary timer-controlled switch 71 is open, the second auxiliary timer-controlled switch 131 is closed, the main thermal heater control switch 25 is closed and contact arms 153 and 151 of the auxiliary thermal switch 145 are in engagement with each other by reason of the fact that less than a predetermined fractional part of the water content of the tank is hot so that tubular member 147 is subject to cold water. Conductor 127 is energized, all as has hereinbefore been set forth, during the prolongation period and coil 179 was energized simultaneously with the closure of auxiliary switch 131 by reason of the energization prolongation cam member 139 having effected closure of switch 131.

During the earlier part of the operation of the system, starting either with the start of an off-peak period or after a predetermined delay period, the coil 179 of the wattmeter controlling member would not have been energized since conductor 127 was not energized so that switch arm 177 would be in its lower position, shown by the broken lines in Fig. 4, so that current flowing through the heater 21 would flow through low-rate wattmeter 163.

Figures 5, 6:
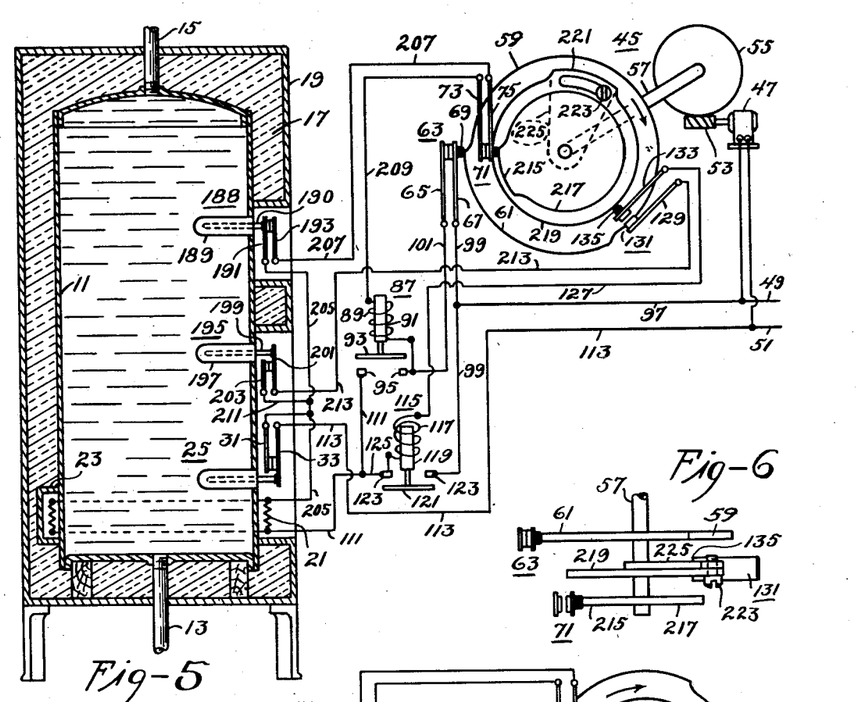
Fig. 5 is a view similar to Figs. 1 and 3 but showing a still further modification of the system embodying my invention.
Fig. 6 is a top plan view of part of the timing means used by me, and, Fig. 7 is a view similar to Fig. 5, showing the same system as shown in Fig. 5 but having added thereto a low-rate wattmeter and a high-rate wattmeter.

Referring now to Fig. 5 of the drawings, I have there illustrated a still further modification of a water heating system embodying my invention in which delay of the energization of the heater is effected if less than a predetermined fractional part of the water content of the tank is hot at the start of an off-peak period, say on the order of one-third of the tank content, and which will effect prolongation of the energization of the heater after the end of an off-peak period if another predetermined fractional part of the water content is not hot at the end of an off-peak period, which, for illustrative purposes, may be two-thirds of the tank content. It is to be understood that I do not desire to be limited to the specific one-third and two-thirds fractional parts but may make these any desired parts of the total. The amount in question is determined, as has already been hereinbefore set forth, by the position of a plurality of auxiliary thermal control switches subjected to the water at different heights in the tank, and for this purpose I use two auxiliary thermal switches. I provide the continuously operative timing means 45 as already hereinbefore described, a main heater control switch 63 actuable by the timer, a first auxiliary timer-controlled switch 71, and a second auxiliary timer-controlled switch 131. I provide a main thermal heater control switch 25, an energization-delay electromagnetic switch 87 and an energization-prolongation electromagnetic switch 115, as hereinbefore described. For the purposes of this particular modification of my improved hot water system, I provide a first auxiliary thermal switch 188 shown as including a tubular member 189, an expansion rod 190 therein adapted to engage a resilient contact arm 191 normally yieldingly biased out of engagement with a relatively rigid contact arm 193 so long as the thermal switch 188 is subject to the temperature of cold water. I provide further a second auxiliary thermal switch 195 including a tubular member 197, an expansion rod 199 therein adapted to engage a resilient contact arm 201 normally yieldingly biased into engagement with a relatively rigid contact arm 203 but adapted to be moved out of engagement therewith when the tubular member 197 is surrounded by hot water. As above stated, I do not desire to be limited to the specific positions of the first and second auxiliary thermal switch as shown in Fig. 5 of the drawings but may place them at any part along the height of the tank.

One terminal of heater 21 is connected by a conductor 205 with contact arm 31 of the main thermal switch 25 and also by conductor 205 with contact arm 191 of the first or upper thermal switch 188. Contact arm 193 of the upper auxiliary thermal switch 188 is connected by a conductor 207 with contact arm 75 of the first auxiliary timer-controlled switch 71. Contact arm 73 of switch 71 is connected by a conductor 209 with one terminal of coil 89 of the energization-delay switch 87. A conductor 211 connects conductor 205 with contact arm 203 of the second auxiliary thermal switch 195 while a conductor 213 connects contact arm 201 with contact arm 129 of the second auxiliary timer-controlled switch 131.

Let it be assumed, for illustrative purposes, that the continuously operative timer 45 is in the position shown in Fig. 5 of the drawings at a few minutes after the start of an off-peak period when main heater control switch 63 is closed, the auxiliary timer-controlled switch 71 is closed, when the amount of hot water in the tank is less than sufficient to open main thermal switch 25, and is also less than sufficient to open the lower auxiliary thermal switch 195, but is sufficient to surround tubular member 189 with hot water and cause engagement of contact arms 191 and 193. The energizing circuit of coil 89 will therefore be effected substantially as follows: From supply circuit conductor 49 through conductors 97 and 99 to and through engaged contact arms 67 and 65, through conductor 101 to and through coil 89, from there through conductor 209 to and through engaged contact arms 73 and 75, through conductor 207, to and through engaged contact arms 193 and 191, through conductor 205, through engaged contact arms 31 and 33 and from there through conductor 113 to the other supply circuit conductor 51. The energized coil 89 will cause the core 91 and the contact bridging member 93 to occupy the positions shown in Fig. 5 of the drawings whereby energization of the heater 21 through the electromagnetic switch 87 is prevented. Of course, if the amount of cold water in the tank at the start of an off-peak period is such that tubular member 189 of the upper switch 188 is surrounded by cold water, then contact arms 191 and 193 would be out of engagement with each other so that the above described energizing circuit of coil 89 would not be effected whereby a heater-energizing circuit as follows would be provided: From supply circuit conductor 49 through conductors 97 and 99 to and through engaged contact arms 67 and 65, through conductor 101 to and through engaged contact members 95 and 93, through conductor 111 and heater 21, through a part of conductor 205 to and through engaged contact arms 31 and 33 and from there through conductor 113 to the other supply circuit conductor 51.

Should it occur that enough water in the upper part of the tank is heated to subject the upper auxiliary thermal switch 188 to hot water, contact arms 191 and 193 would be moved into engagement with each other with resultant energization of the coil 89, provided that sufficient water in the tank is heated to surround tubular member 189 during the time that the first auxiliary timer-controlled switch 71 is in its closed position, which delay period may be considered to be on the order of two or three hours.

It is evident that after contact arm 75 of the first timer-controlled switch 71 has been moved out of engagement with arm 73, the temperature condition affecting switch 188 no longer has any effect upon the energization of heater 21 and such energization will be interrupted only in case all of the water in the tank is hot. Disengagement of contact arm 33 from contact arm 31 by the action of the main thermal heater control switch will effect deenergization of the heater.

Let it be assumed, however, that less than enough water in the tank was heated to envelope tubular member 197 before the end of the off-peak period, that is, contact arm 201 is still in engagement with contact arm 203 just before the end of an off-peak period when main timer control switch 63 is still closed and the second auxiliary timer-controlled switch 131 has been moved into closed position, it being understood that this second auxiliary timer-controlled switch 131 is moved into closed position a short time before the end of an off-peak period.

Under the above mentioned conditions an energizing circuit will be closed through coil 117 substantially as follows: From supply circuit conductor 49 through conductors 97 and 99 to and through engaged contact arms 67 and 65, through conductor 101 to and through the engaged contacts 93 and 95, through conductors 111 and 125 to and through coil 117, through conductor 127 to and through engaged contact arms 133 and 129, through conductor 213 to and through engaged contact arms 201 and 203, through conductor 211 to and through engaged contact members 31 and 33 and from there through conductor 113 to the other supply circuit conductor 51.

This will energize coil 117 and provide a prolongation energization circuit through heater 21 substantially as follows: From supply circuit conductor 49 through conductors 97 and 99 to and through engaged contact members 123 and 121, through conductors 125 and 111 to the heater 21, through conductor 205 to and through engaged contact arms 31 and 33 and from there through conductor 113 to the other supply circuit conductor 51.

A holding circuit for coil 117 was also established substantially as follows: From supply circuit conductor 49 through conductors 97 and 99, to and through engaged contact members 123 and 121, through coil 117, through conductor 127 to and through engaged contact arms 133 and 129, through conductor 213 to and through engaged contact arms 201 and 203, through conductor 211 to and through engaged contact arms 31 and 33 and from there through conductor 113 to the other supply circuit conductor 51. It will be noted that this holding circuit for coil 117 is independent of the main timer-controlled switch 63 so that this switch may open at the end of an off-peak period without effecting the continuance of the energization of the heater 21. Energization of the heater 21 will be interrupted selectively by the action of the second thermally actuable switch 195 when it becomes subject to hot water by reason of the continued heating of the water in the tank or by reason of the opening of the second auxiliary timer-controlled switch 131 at the end of the adjustably preselected prolongation period.

Referring to Figs. 5 and 6 of the drawings, I have there illustrated a modified form of assembly of the means for effecting closing of the first and the second auxiliary timer-controlled switches 71 and 131 as by a cam surface 215 having peripheral extent of say two or three hours and constituting part of a cam disc 217 mounted on shaft 57. The second auxiliary timer control switch 131 is controlled by an adjustably mounted cam disc 219 having a cam surface 221 of larger outer radius which, when it engages lug 135 of contact arm 133, will move this arm into engagement with arm 129. A clamping set screw 223 permits of adjusting the position of cam disc 219 relatively to cam disc 217 and also relatively to cam disc 59. The fixed peripheral extent of portion 221 of cam 219 determines the prolongation period. If it be desired to vary the duration of this period, this may be done by the use of an additional adjustable cam 225, having an outer radius equal to that of cam surface 221, which additional cam may be held by set screw 223, all as shown in Figs. 5, 6 and 7.

Figure 7:
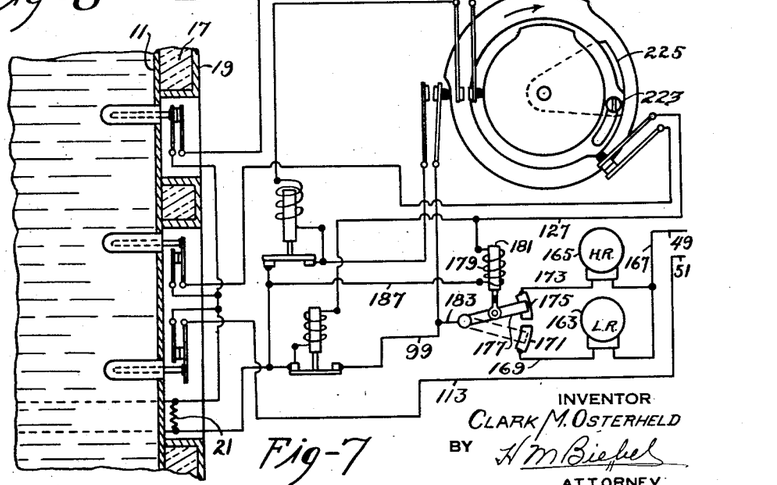

Referring now to Fig. 7 of the drawings, I have there shown the connections which I may employ when providing low-rate wattmeter 163 and a high-rate wattmeter 165 connected in the circuit in a manner to cause current traversing the heater 21 during an off-peak period to be registered by the low-rate meter 163 and any current traversing the heater 21 during the on-peak period to flow through meter 165 to be registered thereby. All parts and connections which are the same in this figure as they are in Fig. 5 of the drawings have been given the same numerals for the sake of simplicity.

The same comments as to the operation of the electromagnetic relay coil 179 in its action upon switch arm 177 as were made hereinbefore when describing Fig. 4 of the drawings will apply here also and it is evident that I therefore provide relatively simple means, electromagnetically controlled, for ensuring that the meters provided for the off-peak and the on-peak periods will be properly effective to record the current used by my improved water heating system during the off-peak and the on-peak periods respectively.

I have hereinbefore described, in connection with each figure of the drawings, the operation of the system disclosed in the respective figures of the drawings and believe it unnecessary to further amplify such descriptions.

The water heating systems employing my invention as shown in the various modifications are relatively simple and easy to provide and install and are adapted to meet widely varying requirements on the part of the supplier of electric current or of the user of such electric current.

While I have illustrated and described certain forms of systems embodying my invention, it is obvious that further modifications may be made without departing from the spirit and scope thereof and all such modifications clearly coming within the scope of the appended claims are to be considered as being covered thereby.

I claim as my invention:

1. An off-peak water heating system for a hot water tank having an electric heater, comprising a continuously operative timer, a plurality of heater control switches actuable respectively by the timer and by tank water temperature, said timer-controlled switch being adapted to be moved into closed heater-energizing position at the start of an off-peak period and to be held in closed position during such period only and the temperature-controlled switch being adapted to be held in heater-energizing position until substantially all of the water in the tank is hot, a heater-energization-delay switch jointly controlled by the timer and tank water temperature and effective to preclude energization of the heater at the start of an off-peak period in case the tank contains more than a predetermined quantity of hot water at the start of an off-peak period and a heater-energization-prolongation switch controlled jointly by the timer and by the temperature of a predetermined part of the water in the tank and effective to cause prolongation of the energization of the heater beyond the end of an off-peak period for a fixed length of time in case the tank contains less than a predetermined quantity of hot water at the end of an off-peak period.

2. An off-peak water heating system for a hot water tank having an electric heater, comprising a continuously operative timer, a heater control switch movable by the timer into heater-energizing position at the start of an off-peak period and held in such position during an off-peak period only, a thermally-actuable heater control switch electrically connected in series circuit with said timer-controlled switch, subject to tank water temperature and adapted to be held in heater-energizing position until substantially all of the water in the tank is hot, an electromagnetic heater-energization-delay switch electrically connected in series circuit relation with the timer-controlled heater switch and the thermally-actuable heater control switch and controlled jointly by the timer and by the temperature of a predetermined part of the water in the tank and effective to prevent energization of the heater for a preset fixed length of time after the start of an off-peak period in case the tank contains more than a predetermined quantity of hot water at the start of an off-peak period and means including an electromagnetic heater-energization-prolongation switch electrically connected in parallel circuit relation with the timer-controlled heater control switch, controlled jointly by the timer and by the temperature of a predetermined part of the water in the tank and adapted to be moved into heater-energizing position before the end of an off-peak period to effect prolongation of the energization of the heater for a preset fixed length of time beyond the end of an off-peak period in case the tank contains less than a predetermined quantity of hot water at the end of an off-peak period.

3. An off-peak water heating system for a hot water tank having an electric heater, comprising a continuously operative timer, a heater control switch movable by the timer into heater-energizing position at the start of an off-peak period and held in such position during an off-peak period only, a thermally-actuable heater control switch electrically connected in series circuit with said timer-controlled switch, subject to tank water temperature and adapted to be held in heater-energizing position until substantially all of the water in the tank is hot, an electromagnetic heater-energization-delay switch electrically connected in series circuit relation with the timer-controlled heater switch and the thermally-actuable heater control switch and controlled jointly by the timer and by the temperature of a predetermined part of the water in the tank and selectively effective to cause energization of the heater at the start of an off-peak period in case the tank contains less than a predetermined quantity of hot water at the start of an off-peak period, to delay energization of the heater after the start of an off-peak period for an adjustably preset length of time fixed by the timer in case the tank contains more than a predetermined quantity of hot water at the start of an off-peak period, to cause deenergization of the heater during the rest of an off-peak period when substantially all of the water in the tank is hot and to cause reenergization of the heater during the rest of an off-peak period in case withdrawal of an appreciable quantity of hot water from the tank occurs during that time and means including an electromagnetic heater-energization-prolongation switch electrically connected in parallel-circuit relation with the timer-controlled heater-control switch, controlled jointly by the timer and by the temperature of a predetermined part of the water in the tank and adapted to be moved into heater-energizing position before the end of an off-peak period to effect prolongation of the energization of the heater for a preset fixed length of time beyond the end of an off-peak period in case the tank contains less than a predetermined quantity of hot water at the end of an off-peak period.

4. An off-peak water heating system for a hot water tank having an electric heater, comprising a continuously operative timer, a heater control switch movable by the timer into heater-energizing position at the start of an off-peak period and held in such position during an off-peak period only, a thermally-actuable heater control switch electrically connected in series circuit relation with said timer-controlled switch, subject to tank water temperature and adapted to be held in heater-energizing position until substantially all of the water in the tank is hot, an electromagnetic heater-energization-delay switch electrically connected in series circuit relation with the timer-controlled switch and the thermally-actuable switch and controlled jointly by the timer and by the temperature of the water at a predetermined point in the tank and effective to prevent energization of the heater for an adjustably preset fixed length of time determined by the timer, after the start of an off-peak period in case more than a predetermined fractional part of the water content of the tank is hot at the start of an off-peak period and means including an electromagnetic adapted to prolong the energization of the heater beyond the end of an off-peak period switch electrically connected in shunt circuit relation with the timer-controlled switch, controlled jointly by the timer and by the temperature of the water at a certain point in the tank and adapted to be moved into heater-energizing position before the end of an off-peak period in case the tank contains less than a predetermined quantity of hot water at that time and to be held in heater-energizing position until the tank contains more than said predetermined quantity of hot water.

5. An off-peak water heating system for a hot water tank having an electric heater, comprising a continuously operative timer, a main and a pair of auxiliary switches controlled by said timer, a plurality of thermally-actuable switches individually responsive to tank water temperature at different heights in the tank, an electromagnetic heater-energization delay switch, an electromagnetic heater-energization-prolongation switch and electric connections between all of said switches and said heater to cause closure of the main timer-controlled switch at the start of an off-peak period to effect energization of the heater through the main timer-controlled switch, the electromagnetic-energization-delay switch and one of said thermally-actuable switches in case more than a predetermined fractional part of the water content of the tank is cold, to delay energization of the heater for a preset fixed time after start of an off-peak period in case less than said predetermined fractional part of the water content is cold, to cause prolongation of the energization of the heater beyond the end of an off-peak period for a preset fixed length of time through the electromagnetic-energization-prolongation switch and said one thermally-actuable switch in case the tank contains a predetermined quantity of cold water at the end of an off-peak period, and to cause deenergization of the heater by said one thermally-actuable switch in case all of the water in the tank is hot.

6. A system as set forth in claim 1 and including a high-rate meter, a low-rate meter and electromagnetic means for causing said low-rate meter to be connected in current recording circuit with the electric heater during an off-peak period and for causing said high-rate meter to be connected in current recording circuit with the electric heater during an energization-prolongation period.

7. A system as set forth in claim 5 and including a high-rate meter, a low-rate meter and electromagnetic means for causing said low-rate meter to be connected in current recording circuit with the electric heater during an off-peak period and for causing said high-rate meter to be connected in current recording circuit with the electric heater during an energization prolongation period.

CLARK M. OSTERHELD.